…

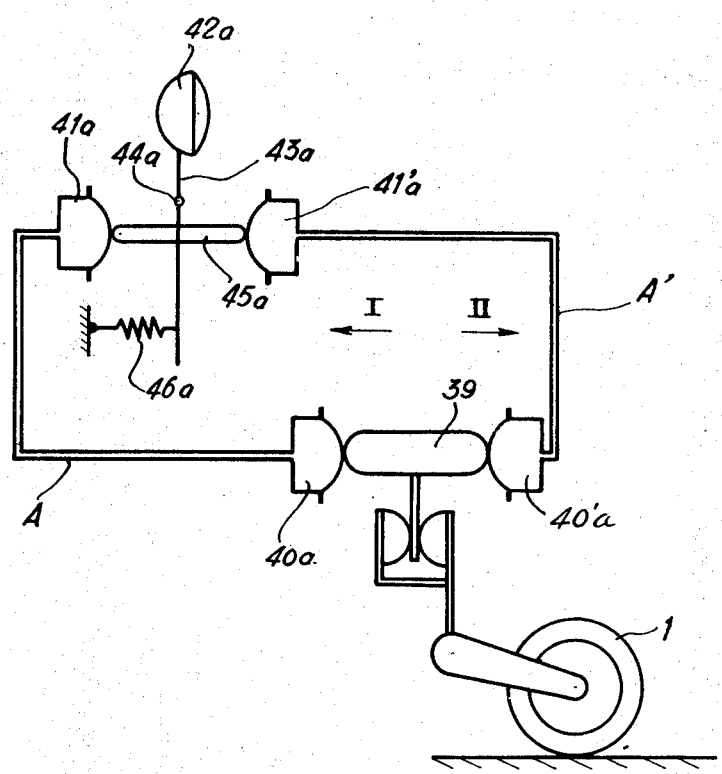

United States Patent Office 3,529,424
Patented Sept. 22, 1970

3,529,424
FLUID CONTROL SYSTEMS FOR AUTOMATICALLY CONTROLLING THE ORIENTATION OF MOTOR VEHICLE HEADLAMPS
Pierre Cibie, Bobigny, France, assignor to Projecteurs Cibie, Bobigny, France, a French company
Filed Jan. 14, 1969, Ser. No. 791,111
Claims priority, application France, Jan. 24, 1968, 137,229
Int. Cl. B60q 1/12; F15b 7/00
U.S. Cl. 60—54.5    4 Claims

ABSTRACT OF THE DISCLOSURE

A control member becomes displaced in an amount and a direction correspondingly to orientation of the vehicle's front wheels. A controlled member adjusts the orientation of the vehicle headlamps in response to displacement of the control member. Two identical hydraulic or pneumatic branches transmit movement of control member to controlled member. Each branch is closed by a membrane at one end engaging control member, and is closed at its other end by a membrane engaging controlled member, each pair of membranes engaging opposite ends of their respective members, so that they oppose each other.

---

This invention relates to fluid control systems for automatically controlling the orientation of motor vehicle headlamps.

Automatic control systems for the orientation of headlamps of a motor vehicle by means of their seatings are already known which comprise a control member displaceable as a result of the movement of the body of the vehicle in relation to the wheels, said control member in the course of its displacement deforming a flexible membrane of at least one seal belonging to a hydraulic transmission circuit of constant volume and which includes at least a second membraned seal, the deformations of the membrane of the first seal being transmitted to that of the second seal by the fluid contained in the circuit which finally effects the orientation of the headlamp. Systems of this type have been described in, for example French Pat. No. 1,438,576.

Systems of this type give satisfaction except that a considerable variation of the ambient or local temperature at a point of the hydraulic transmission circuit involved a certain variation of the volume of the fluid in the circuit, which causes an undesired displacement of the membrane of the second seal, which results in a disarrangement of the orientation of the headlamp controlled by this second seal in relation to its normal control position corresponding to a specific uniform temperature of the circuit.

For a control system of the type described, the present invention proposes a new arrangement of the hydraulic transmission circuits which suppresses the effects of the variations in temperature on the control of the orientation of the headlamps.

According to the present invention there is provided an automatic control system for the orientation of a headlamp of a motor vehicle by means of its seating, comprising at least one hydraulic or pneumatic transmission circuit between a control member and a controlled member, the or each transmission circuit being divided into two in order to provide two identical branches mounted in opposition in relation to the displacement of the control member and of the controlled member, which ensures a balance of the temperature.

When it is said that the branches are "mounted" in opposition in relation to the displacement of the control member and of the controlled member, it is to be understood that the displacement of the control member brings about in each branch a similar displacement of volume of fluid which for one branch takes place in the direction control member/controlled member and in the opposite direction for the other branch.

Due to this mounting the variation of the ambient or local temperature has no effect on the control of the system since in both branches it produces a similar variation of pressure with no overall effect, due to the opposed mounting as described above.

The following description, which refers to the single figure of the accompanying drawings, will make it easier to understand how the present invention is put into operation.

The single figure of the accompanying drawing illustrates, as an example, the division into two or the hydraulic control circuit in an embodiment of the control system identical to that of FIG. 4 of the aforementioned French Pat. No. 1,438,576.

The reference of this figure of French Pat. No. 1,438,576 has been preserved to refer to the components which remain unchanged namely: wheel 1, control member 39 which displaces from right to left, headlamp 42a, support arm for the headlamp 43a, oscillation shaft 44a of the arm of the headlamp, entrainment pin 45a of the arm, return spring 46a of the arm. In FIG. 4 of the aforesaid patent, the transmission of the displacements of the member 39 to the pin 45a take place with the assistance of a single hydraulic circuit terminated at its two ends by two membraned seals 40a, 41a.

In accordance with the invention, this transmission is now divided into two and takes places through the intermediary of two branches A and A', terminating respectively at each of their ends in membraned seals 40a, 41a, 40a', 41a'. The pin 45a is divided into two in order to cooperate, on both sides of the arm 43a, with the seals 41a, 41a' respectively.

The operation of the modified system is simple to understand; a displacement of the member 39, in the direction I or in the direction II produces a similar movement of the double pin 45a, through the intermediary of one or the other identical branches A and A'. The synchronisation of the headlamp 42a to the displacements of the member 39 thus remains in accordance with that described in the aforesaid patent.

On the other hand, and this is the principal point of the present invention, a variation of temperature acting identically on the two identical branches A and A' only produce the same variation in pressure in both the branches. Due to this fact and due to the symmetrical mounting of the two branches A and A' in relation to the pin 45a, the variations of temperature in no way modifying the predetermined orientation of the headlamp 42a.

The control system, improved in this way thus has a perfectly balanced temperature characteristic.

On the single figure there is only shown the control system and one headlamp 42a; naturally the control of the other headlamp may take place in the same manner, still being controlled by the displacements of the member 39.

In addition, the teachings of the invention can obviously apply to all systems for synchronising the orientation of headlamps to the displacement of a control member and in which the connection between the control member and the headlamps take place by means of a hydraulic circuit of constant volume sealed by membranes; in all cases the balancing of temperature may be effected by a splitting of a circuit into two branches mounted in opposition.

It is understood that the transmission circuit may contain a gas or a liquid.

What is claimed is:

1. An automatic control system for orienting a motor vehicle headlamp, comprising a control member displaceable in response to relative movement between a wheel and the body of the motor vehicle, a controlled member adapted to move said headlamp in response to movement of the controlled member, and means for transmitting movements of said control member to said controlled member, said means including two identical fluid filled branches, each branch having an end member movable by the fluid within it, the two corresponding end members of said branches being operatively connected to opposite sides of said control member so that one or the other of said operatively connected end members is pushed against the fluid in its respective branch upon displacement of said control member, and the other two corresponding end members of said branches being operatively connected to opposite sides of said controlled member so that one or the other of said latter end members causes movement of said controlled member in response to fluid pressure upon it, the identical nature of said branches causing the fluid within them to expand or contract by the same amount in response to temperature variations whereby the corresponding end members of said branches act upon each of said control and controlled members with equal and opposite force so that variations in temperature produce no movement of said controlled member.

2. An automatic control system as defined in claim 1 wherein said end members are diaphragms.

3. An automatic control system as defined in claim 1 wherein said fluid is a gas.

4. An automatic control system as defined in claim 1 wherein said fluid is a liquid.

References Cited

UNITED STATES PATENTS

| 1,838,252 | 12/1931 | Coppage | 60—54.5 XR |
| 2,250,734 | 7/1941 | Thompson et al. | 240—62.3 |
| 3,013,392 | 12/1961 | Falge et al. | 60—54.5 |

FOREIGN PATENTS

| 718,433 | 11/1954 | Great Britain. |
| 608,561 | 1/1935 | Germany. |
| 1,438,576 | 4/1966 | France. |

MARTIN P. SCHWADRON, Primary Examiner

R. R. BUNEVICH, Assistant Examiner

U.S. Cl. X.R.

60—62.5; 240—62.3